United States Patent
Sentz

(10) Patent No.: US 7,591,081 B2
(45) Date of Patent: Sep. 22, 2009

(54) APPARATUS FOR ASSISTING IN INSTALLATION OF A FENCE

(76) Inventor: Stephen Sentz, P.O. Box 244, Fillmore, NY (US) 14735

( * ) Notice: Subject to any disclaimer, the term of this patent is extended or adjusted under 35 U.S.C. 154(b) by 24 days.

(21) Appl. No.: 11/938,364

(22) Filed: Nov. 12, 2007

(65) Prior Publication Data

US 2009/0119941 A1    May 14, 2009

(51) Int. Cl.
    *G01B 3/10*    (2006.01)
(52) U.S. Cl. .......................................... 33/759; 33/679.1
(58) Field of Classification Search ............... 33/755, 33/759, 760, 771, 679.1
    See application file for complete search history.

(56) References Cited

U.S. PATENT DOCUMENTS

| | | | | |
|---|---|---|---|---|
| 4,149,320 A | * | 4/1979 | Troyer et al. | 33/758 |
| 4,827,621 A | * | 5/1989 | Borsuk | 33/758 |
| 5,107,601 A | * | 4/1992 | Semchuck | 33/759 |
| 5,950,321 A | * | 9/1999 | Pena et al. | 33/758 |
| 6,082,018 A | * | 7/2000 | Wells | 33/759 |
| 6,494,014 B2 | * | 12/2002 | Lafrance | 33/758 |
| 6,763,601 B1 | * | 7/2004 | Turley | 33/566 |
| 2004/0226179 A1 | * | 11/2004 | Harris | 33/1 B |
| 2005/0034320 A1 | * | 2/2005 | Connor | 33/760 |
| 2007/0253785 A1 | * | 11/2007 | Tyler | 405/302.6 |

* cited by examiner

Primary Examiner—G. Bradley Bennett
(74) Attorney, Agent, or Firm—Intellipex PLLC; Jay Schloff

(57) ABSTRACT

Disclosed is an apparatus for assisting in installation of a fence covering an area, for example, a garden. The apparatus includes a box and a sheet material housed in the box. The box further includes an opening such that the opening facilitates the sheet material to be withdrawn out of the box. The sheet material includes plurality of equidistant markings disposed along a longitudinal axis of the sheet material. The plurality of equidistant markings serves as indicators for equidistant placement of a plurality of posts of the fence, thereby assisting in correct installation of the fence. In one embodiment, the sheet material includes a biodegradable material. In another embodiment, the sheet material includes a weed-controlling agent.

6 Claims, 3 Drawing Sheets

APPARATUS FOR ASSISTING IN INSTALLATION OF A FENCE

FIELD OF THE INVENTION

The present invention relates generally to installation of fences, and more particularly, to an apparatus for assisting in installation of a fence.

BACKGROUND OF THE INVENTION

A fence may be installed around an area to protect the area from intruders. For example, the fence may be installed around a field to protect crops from stray animals or around a garden to prevent any intruder from entering inside the garden. A fence generally includes vertical posts fixed to the ground and horizontal rails fixed onto the vertical posts, thereby providing a barrier to the intruders.

Installation of the fence may require various measuring and digging tools. The measuring tools are required for placing markings on the ground so that fence posts may be installed on the markings. Moreover, various digging tools are required for digging ground at the markings.

However, installation of the fence may have certain difficulties. For example, the fence may not be installed properly if the markings are not proper. More specifically, when the markings are at unequal distances, horizontals rails of the fence may not fix properly between consecutive fence posts. Moreover, since the fence covers a portion of ground area beneath the rails of the fence, it is difficult to remove weeds grown beneath the fence.

Accordingly, there is a need for an apparatus that assists in enabling faster, simpler, and proper installation of a fence. Moreover, there is a need for an apparatus that may help in removal of weeds from the ground area beneath the fence rails.

SUMMARY OF THE INVENTION

An object of the present invention is to provide an apparatus enabling a faster, simpler and proper installation of a fence.

Another object of the present invention is to provide an apparatus to facilitate equidistant placement of posts of the fence.

Yet another object of the present invention is to provide an apparatus to facilitate easy removal of weeds from ground area beneath the fence.

In view of the foregoing disadvantages inherent in the prior art, the general purpose of the present invention is to provide an apparatus for assisting in installation of a fence and configured to include all the advantages of the prior art, and to overcome the drawbacks inherent therein. The apparatus includes a box having an opening. The apparatus further includes a sheet material housed in the box. The sheet material is capable of being withdrawn out of the opening of the box.

The sheet material includes a plurality of equidistant markings disposed along a longitudinal axis of the sheet material. The plurality of equidistant markings serves as indicator for equidistant placement of posts of the fence. In one embodiment of the present invention, the sheet material is of a biodegradable material. Accordingly, after the fence is installed, the sheet material may biodegrade, thereby avoiding polluting the ground area beneath the fence.

In one embodiment of the present invention, the sheet material includes a weed control agent. The weed control agent facilitates elimination of weeds from the ground area beneath the fence after the fence is installed, thereby avoiding a need of weed whacking tools or chemicals for killing weeds.

This together with other embodiments of the present invention, along with the various features of novelty that characterize the present invention, are pointed out with particularity in the claims annexed hereto and form a part of this disclosure. For a better understanding of the present invention, its operating advantages, and the specific objects attained by its uses, reference should be made to the accompanying drawings and the descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE INVENTION

The exemplary embodiments described herein detail for illustrative purposes are subject to many variations in structure and design. It should be emphasized, however, that the present invention is not limited to a particular apparatus for assisting in installation of a fence, as shown and described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting.

The present invention provides an apparatus for assisting in installation of a fence in a fast, simple, and reliable manner. The apparatus includes a box and a sheet material housed inside the box. The sheet material can be withdrawn through an opening of the box. The sheet material includes a plurality of equidistant markings disposed along a longitudinal axis of the sheet material. The plurality of equidistant markings serves as indicators for equidistant placement of a plurality of posts of the fence.

Figure 1:
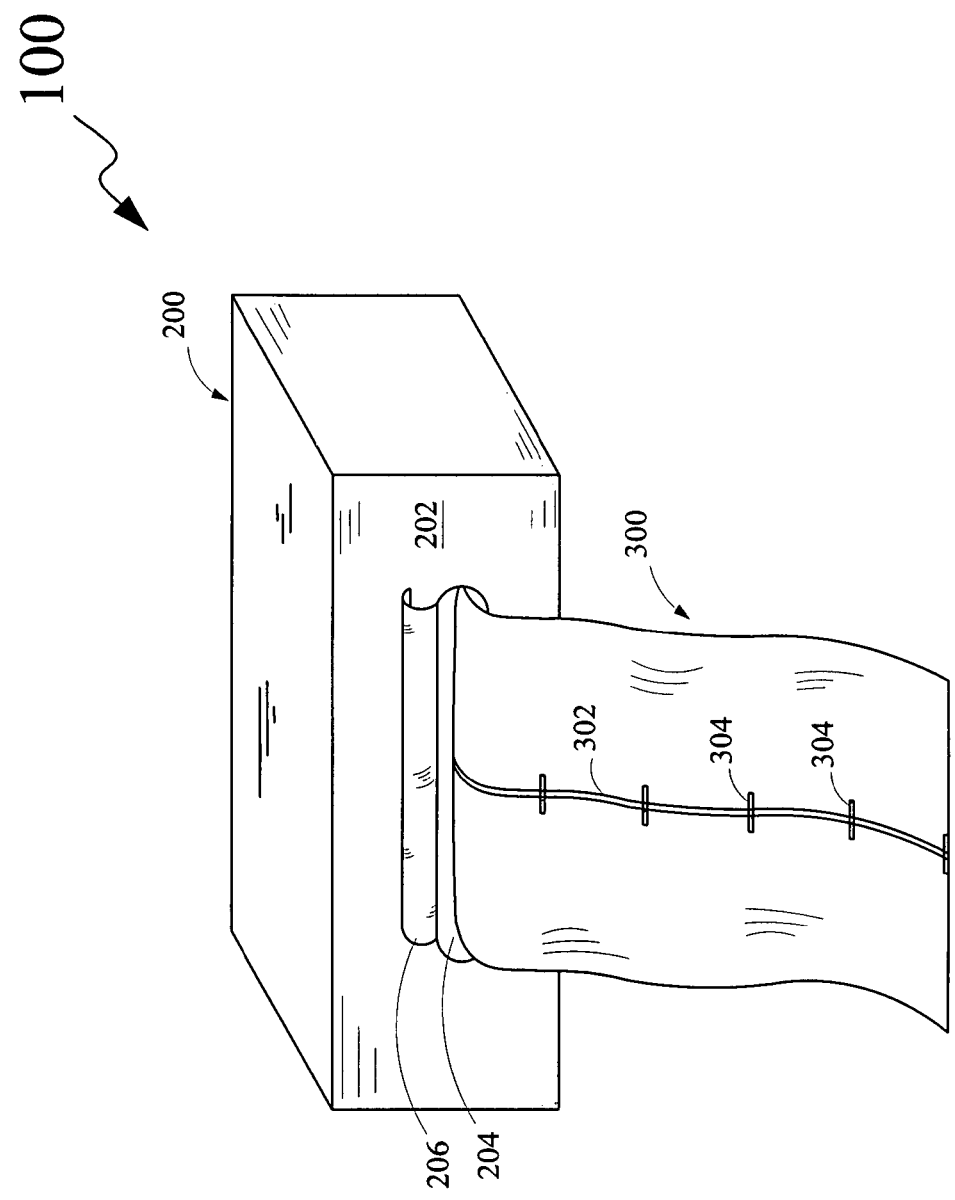
FIG. 1 illustrates an apparatus for assisting in installation of a fence, according to an embodiment of the present invention.

FIG. 1 illustrates an apparatus 100 for assisting in installation of a fence, according to an embodiment of the present invention. The apparatus 100 includes a box 200 and a sheet material 300 housed in the box 200. At least one face of the box 200 includes an opening. As shown in FIG. 1, a front face 202 of the box 200 may include an opening 204. The sheet material 300 is capable of being withdrawn out (i.e., pulled out) of the opening 204 of the box 200.

Additionally, a removable flap 206 (for example, a tear out flap) is present on the front face 202 that is used for covering the opening 204 of the box 200 when the apparatus 100 is not in use. For accessing the sheet material 300, the flap 206 is removed from the opening 204 on the front face 202 of the box 200, thereby exposing the opening 204 for pulling out the sheet material 300. Preferably, as shown in FIG. 1, the flap 206 is a partially removable flap with one end always attached to the front face 202 of the box 200. Using such a flap 206, the opening 204 may be covered when the apparatus 100 is not in use (or between subsequent uses of the apparatus 100), for inhibiting dirt, dust, and other contaminants from contacting the sheet material 300.

In one embodiment, the sheet material 300 may be housed in the box 200 in form of a roll such that when the sheet material 300 is pulled out of the opening 204, the sheet material 300 may unwrap from the roll. The sheet material 300 may have a width of about 6 inches to about 12 inches; and a length and about 25 feet to about 200 feet. Although dimensions of the sheet material 300 are specified, it should be understood that the dimensions of the sheet material 300, as suggested above, are variable according to the application of the apparatus 100.

The sheet material 300 includes a plurality of equidistant markings throughout a length of the sheet material 300 and along a longitudinal axis of the sheet material. More specifically, as shown in FIG. 1, the sheet material 300 includes a plurality of markings 304 along a central line 302 (along a central longitudinal axis) of the sheet material 300. Each of the plurality of markings 304 may be spaced apart at a desired distance from adjacent markings 304. In one embodiment, the markings may be spaced apart at a distance of 2 feet. Such equidistant markings 304 serve as indicators for equidistant placement of a plurality of posts of a fence, thereby enabling alignment of the plurality of posts for proper installation of the fence.

Additionally, the sheet material 300 may include a slit at each of the plurality of markings 304. A post of the fence may be received through the slit and into the ground. The slits on the markings 304 further facilitate the installation of the fence. More specifically, while the plurality of markings 304 serves as indicators for equidistant placement of a plurality of posts; the slits function as channel at these indicators for fixing the posts to the ground.

To ensure that the usage of the sheet material 300 does not pollute the ground area beneath the fence, the sheet material 300 is made of an easily decomposable material. In one embodiment, the sheet material 300 is composed of a biodegradable material. The biodegradable material decomposes with time, thereby avoiding polluting the ground area beneath the fence.

The sheet material 300 may further comprise a weed controlling agent. The weed controlling agent enables killing the weeds beneath the fence, thereby eliminating the need for a weed whacker or a chemical weed killer. In one embodiment, the sheet material 300 is of green color, thereby facilitating blending of the sheet material 300 with grass and other vegetation on the ground. In one embodiment, the weed controlling agent is a mustard plant derivative.

Figure 2:
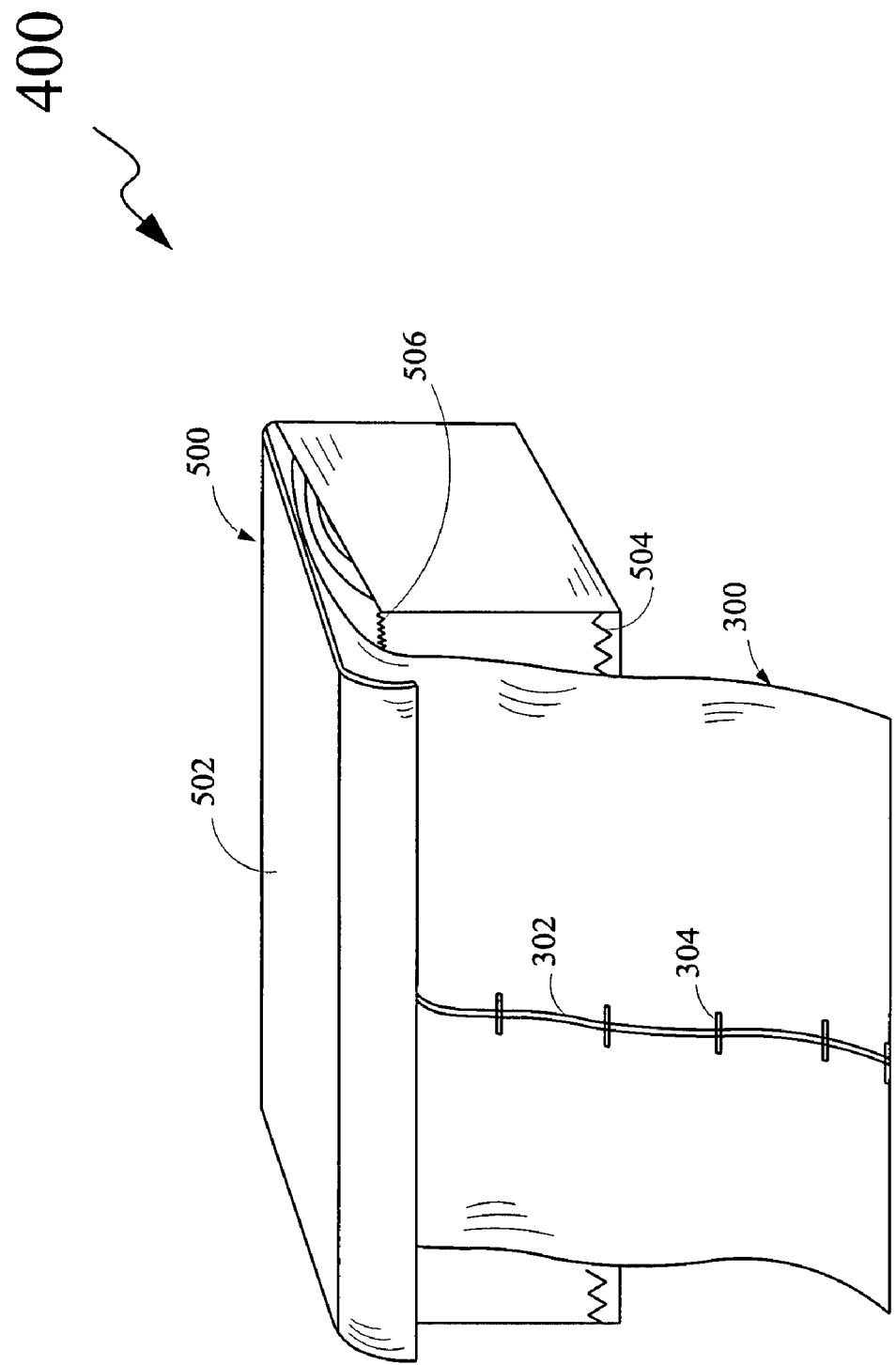
FIG. 2 illustrates an apparatus for assisting in installation of a fence, according to another embodiment of the present invention.

FIG. 2 illustrates an apparatus 400 for assisting in installation of a fence, according to another embodiment of the present invention. The apparatus 400 of FIG. 2 is similar to the apparatus 100 of FIG. 1, except that the configuration of a box 500 of apparatus 400 is modified from the configuration of the box 200 of the apparatus 100. Accordingly, in FIG. 2, same reference numerals denote the same components as those of the apparatus 100 shown in FIG. 1, except the box 200 being replaced by the box 500.

Accordingly, the apparatus 400 includes the box 500 and the sheet material 300 housed in the box 500. The box 500 includes an opening on a top of the box 500. The opening may be a flapped opening such that removing a flap 502 from the top of the box 500 exposes the sheet material 300. Thereafter, the sheet material 300 may be unwrapped from the roll, as described in FIG. 1. A desired length of the sheet material 300 may be utilized from the roll, and subsequently the sheet material 300 may be ripped off from the roll by utilizing at least one corrugated edge 504 of the box 500. For example, as illustrated in FIG. 2, an edge of the opening is in the form of a corrugated edge, hereinafter referred to as a corrugated edge 504. The corrugated edge 504 of the box 500 may be utilized for ripping off a desired length of the sheet material 300 from the roll. Further, the box 500 may include another corrugated edge 506 for ripping off a desired length of the sheet material 300 from the roll. For the purpose of this description, the box 500 is shown to include two corrugated edges. However, it should be obvious to a person skilled in the art that the box 500 may include more or less number of corrugated edges depending on the requirements.

Figure 3:
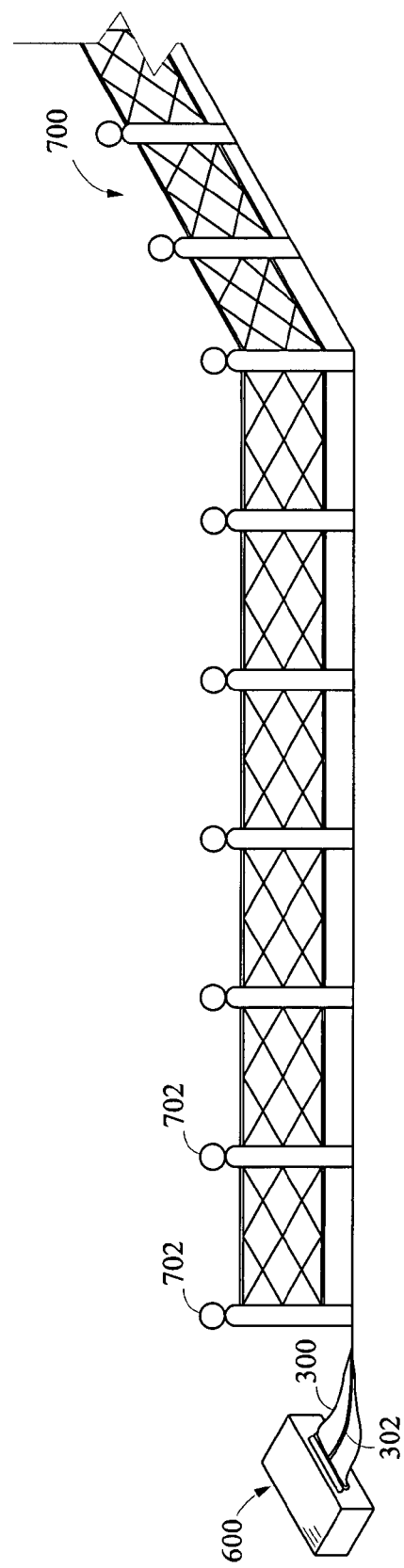
FIG. 3 illustrates an apparatus configured with a fence for assisting in installation of the fence, according to various embodiments of the present invention.

FIG. 3 illustrates an apparatus 600 configured with a fence 700 for assisting in installation of the fence 700, according to various embodiment of the present invention. The apparatus 600 may be one of the apparatus 100 and the apparatus 400, described in FIGS. 1 and 2, respectively. The apparatus 600 may be placed on ground where the fence 700 is desired to be installed. The sheet material 300 is pulled out of the box and spread on the ground. Thereafter, a plurality of posts 702 is placed on a plurality of markings of the sheet material 300 and through the slit at each marking, thereby enabling the equidistant placement of the posts 702 for proper installation of the fence 700. The posts 702 may be pressed into the ground, thereby pushing the sheet material 300 into the ground. As described with respect to FIG. 1, the plurality of marking is along the central line 302. For example, in case of a 6 inch-wide sheet material, the posts 702 may be installed along the central line 302 on the sheet material 300, with nearly three inches of the sheet material 300 being available on each side of the fence 700. Also, due to the properties of material being used, once the sheet material 300 may be pushed underground, the sheet material 300 biodegrades leaving behind the weed controlling agent in the ground area beneath the fence 700.

The apparatus of the present invention serves as an effective tool in proper installation of a fence. The overall configuration of the apparatus and in particular the presence of equidistant markings on a sheet material facilitate correct placement of posts on ground, thereby enabling a faster and simpler installation of the fence. Moreover, since the sheet material utilized by the apparatus is composed of a biodegradable material, the apparatus avoids polluting the ground where the fence is installed. Additionally, the sheet material includes a weed controlling agent for facilitating easy removal of weeds from ground area beneath the fence.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present invention and its practical application, and thereby enable others skilled in the art to best utilize the present invention and various embodiments with various modifications as are suited to the particular use contemplated. It is understood that various omissions and substitutions of equivalents are contemplated as circumstances may suggest or render expedient, but such are intended to cover the application or implementation without departing from the spirit or scope of the claims of the present invention.

What is claimed is:

1. An apparatus for assisting in installation of a fence, comprising:
   a box comprising an opening; and
   a sheet material housed in the box and capable of being withdrawn out of the opening of the box, the sheet material comprising a plurality of equidistant markings disposed along a longitudinal axis of the sheet material;
   wherein the plurality of equidistant markings serve as indicators for equidistant placement of a plurality of posts of the fence, and
   wherein the sheet material is composed of a biodegradable material, and
   wherein the sheet material has a weed controlling agent.

2. The apparatus of claim 1, wherein the sheet material further comprises a slit at each marking of the plurality of markings for facilitating installation of the plurality of posts of the fence.

3. The apparatus of claim 1, wherein the box further comprises a removable flap covering the opening of the box, and wherein the flap is removed for enabling access to the sheet material.

4. The apparatus of claim 1, wherein the box comprises at least one corrugated edge for ripping off a desired length of the sheet material.

5. The apparatus of claim 4, wherein an edge of the opening of the box is a corrugated edge for ripping off a desired length of the sheet material.

6. The apparatus of claim 5, wherein an edge of the opening of the box is a corrugated edge for ripping off a desired length of the sheet material.

* * * * *